United States Patent [19]

Brook

[11] 4,150,374
[45] Apr. 17, 1979

[54] SENSING DEVICE FOR USE IN POULTRY PROCESSING

[75] Inventor: Richard M. Brook, Huddersfield, England

[73] Assignee: AutoSystems Limited, Yorkshire, England

[21] Appl. No.: 791,129

[22] Filed: Apr. 25, 1977

[30] Foreign Application Priority Data

Apr. 23, 1976 [GB] United Kingdom ............... 16485/76

[51] Int. Cl.² .......................................... G08B 21/00
[52] U.S. Cl. ...................................... 340/674; 17/11
[58] Field of Search ..................... 340/259, 421; 17/11

[56] References Cited

U.S. PATENT DOCUMENTS

| 2,615,081 | 10/1952 | Hoff | 340/259 |
| 3,067,412 | 12/1962 | Dixon | 340/259 |

FOREIGN PATENT DOCUMENTS

| 1105003 | 3/1968 | United Kingdom | 261/18 R |
| 1114051 | 5/1968 | United Kingdom | 239/26 |
| 1212094 | 11/1970 | United Kingdom | 56/349 |
| 1342552 | 1/1974 | United Kingdom | 415/168 |

OTHER PUBLICATIONS

"Carcass Singeing Controlled" Food Engineering, vol. 26, No. 6, p. 5, Jun., 1954. New York.

Primary Examiner—Glen R. Swann, III
Attorney, Agent, or Firm—John C. Smith, Jr.

[57] ABSTRACT

A sensing device for use with a poultry conveyor system to detect the passage of a poultry carcass supported on a carrier device arranged to move along a predetermined path includes two sensors, a first sensor which is actuated by passage of the carrier device and a second sensor which is actuated by the passage of the poultry carcass itself. The first and second sensing devices are connected to an indicating means which is arranged to emit a signal only when both sensing means are actuated. This avoids the possibility of more than one signal being emitted by a single poultry carcass during movement along the path.

5 Claims, 3 Drawing Figures

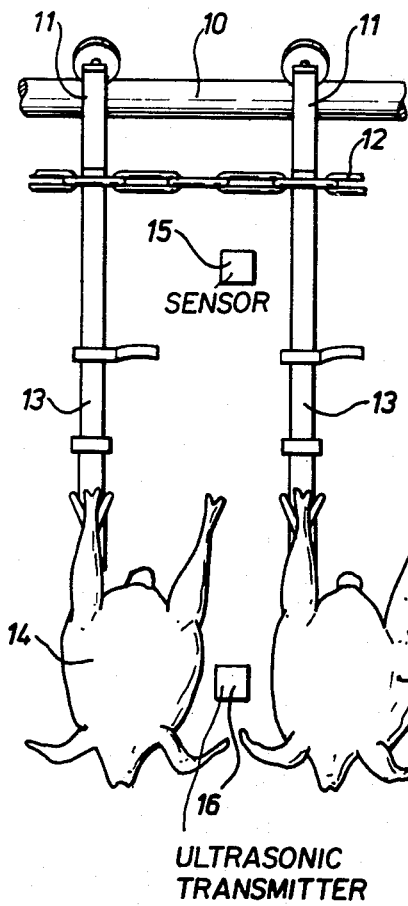
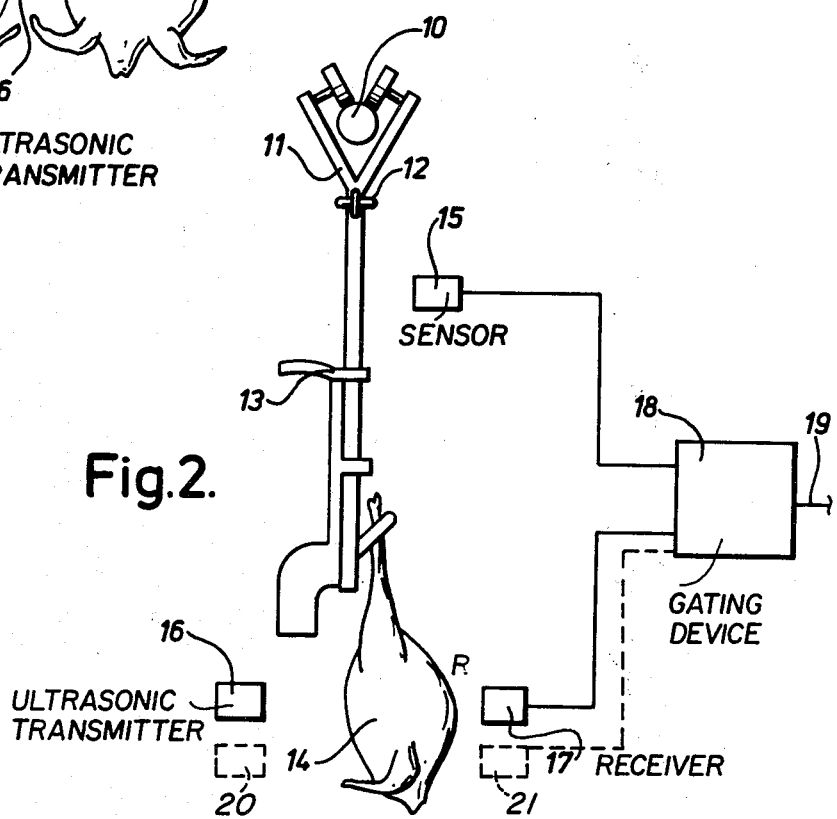

SENSING DEVICE FOR USE IN POULTRY PROCESSING

BACKGROUND TO THE INVENTION

The invention relates to sensing devices.

In conveyor systems for use in poultry processing, it is frequently necessary to sense whether or not a bird carried by the conveyor is passing a particular point, for example to count the number of birds being processed, but considerable difficulties have been encountered in developing a sensing device which will operate satisfactorily and emit only one signal for each bird passing the sensing device.

DESCRIPTION OF THE PRIOR ART

Attempts have been made to sense passage of each bird itself, using photo-electric devices, but it has been found in practice that these devices eventually become inoperative as they become coated with feathers, dirt, blood and water. Even when these devices are operating, they may emit several signals during the passage of a single bird, one signal being caused by the body of the bird for example, and other signals perhaps being caused by a leg or wing of the bird. These difficulties are particularly acute during the early processing stages, such as de-feathering.

In view of the difficulties in sensing the bird itself, known systems have generally been obliged to rely on sensing the passage of part of the conveyor which carries the bird, this part usually comprising a carrier such as a trolley running on a continuous overhead conveyor. The only known sensors which remain largely unaffected by the difficult conditions in a poultry processing plant are sensors of the metal detection type which can still operate when coated with dirt, feathers and the like, but obviously such sensors cannot be used to detect the birds themselves. There are thus two reasons for not sensing the bird directly. Firstly, it is liable to emit more than one signal, and secondly, the only known reliable detectors can only be used to sense a metallic part such as a trolley. However the known arrangement has the serious disadvantage that if one or more of the trolleys is not carrying a bird, this will not be recorded by the sensing device and a false count will be obtained.

OBJECT OF THE INVENTION

It is the object of the invention to overcome the difficulties encountered with the prior art devices and provide a sensing device which will operate satisfactorily in the difficult operating conditions experienced in a poultry processing plant and will not emit a false signal on passage of a carrier which is not carrying a bird.

SUMMARY OF THE INVENTION

The invention provides a sensing device for use in poultry processing to detect the passage of a bird carried by a carrier device, the sensing device comprising:
(a) a first sensing means which is actuated by the passage of the carrier device; (b) a second sensing means which is actuated by the passage of the bird;
(c) indicating means connected to the first sensing means and to the second sensing means and arranged to emit a signal only when both sensing means are actuated.

By sensing both the presence of a carrier and any bird carried by the carrier, the reliability of the sensing device is increased and the possibility of emitting a false signal is avoided. Even if the bird causes two signals to be emitted, e.g. one by the body of the bird and one by a wing, only one signal will be initiated by the carrier, and so the indicating means will only produce a single count.

After considerable experimentation, we have discovered that ultrasonic sensing means is substantially unaffected by the feathers, dirt, blood, and water which, in a poultry processing plant, tend to coat anything in the immediate vicinity of the birds. It is therefore preferred that the second sensing means comprises an ultrasonic sensing means.

Preferably the first sensing means and the second sensing means are each arranged to emit an electrical signal when actuated, both sensing means being connected to a gate device so that a signal is only emitted by the gate device when the gate device receives two signals simultaneously, one from the first sensing means and one from the second sensing means.

The invention also provides, in a conveyor system for conveying birds along a path through a poultry processing plant, each bird being suspended on a carrier from an overhead conveyor:
(a) an ultrasonic transmitter arranged below the carriers at one side of the path;
(b) an ultrasonic receiver arranged below the carriers at the other side of the path and directed towards the ultrasonic transmitter to receive an ultrasonic beam emitted by said ultrasonic transmitter except when said beam is obstructed by the passage of a bird, obstruction of said beam causing said receiver to emit a first electrical signal;
(c) a sensor arranged alongside said path adjacent to the carriers and sensitive to the passage of each carrier, passage of each carrier past said sensor causing the sensor to emit a second electrical signal;
(d) a gate device coupled to said ultrasonic receiver and said sensor and arranged to be set when it receives one of said second signals, the device being such that it emits a third signal only when it is in the set condition and receives one of said first signals, and is such that it will not emit another third signal until it has been reset by receiving another of said second signals.

The invention further provides a method of detecting the passage of a bird carried by the carrier device along a path during poultry processing, comprising the steps of:
(a) positioning a first sensing means in the path of the carrier device for actuation by the carrier device;
(b) positioning a second sensing means in the path of the bird for actuation by the bird; and
(c) connecting an indicating device to both sensing means and arranging the indicating device so that it only emits a signal when both sensing means are actuated.

BRIEF DESCRIPTION OF THE DRAWINGS

FIG. 1 is a view of a sensing device according to the invention in operation, looking in a direction perpendicular to the direction of travel of a conveyor to which the device is fitted;

FIG. 2 is a view of the device looking in the direction of travel of the conveyor.

DESCRIPTION OF AN EMBODIMENT OF THE INVENTION

Figure 3:
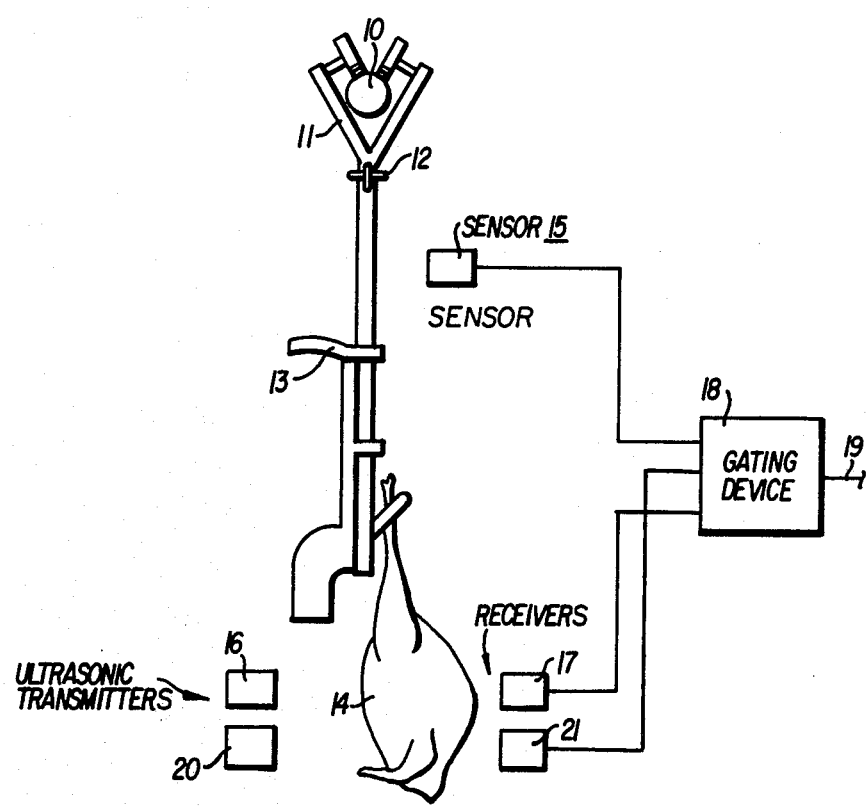
FIG. 3 is a view of another embodiment of the device looking in the direction of travel of the conveyor.

The sensing device forming the subject of this example is intended for use with an overhead chicken processing conveyor. Part of the conveyor is shown in the Figures and it comprises a continuous rail 10 along which a succession of pulleys 11 are drawn by a chain 12. Each trolley 11 has a shackle 13 fitted thereto and each shackle carries a chicken 14.

Positioned adjacent to the path of the trolleys 11 is a proximity sensor 15. The sensor comprises an inductive coil which is sensitive to the passage of each trolley and causes an electrical signal to be emitted each time a trolley passes the sensor.

Positioned adjacent to the path of the chickens, at one side of the path, is an ultrasonic transmitter 16. Aligned with the transmitter, but positioned at the other side of the path, is an ultrasonic receiver 17. The ultrasonic beam emitted by the transmitter 16 normally falls on the receiver 17, except when a chicken passes between. The receiver 17 is arranged to emit an electrical signal each time the ultrasonic beam is interrupted by the passage of a chicken.

The sensor 15 and ultrasonic receiver 17 are electrically connected to a gating device 18 which has an output 19.

The gating device 18 comprises a form of AND gate which is arranged so that a signal will only be emitted at the output 19 when the gating device 18 receives simultaneous signals from the sensor 15 and receiver 17. This ensures that there is a signal at the output 19 only when a trolley carrying a chicken passes the sensing device. In practice the signal from the sensor 15 sets the gating device and maintains it in the set condition as long as the signal from the sensor 15 is maintained, i.e. until the trolley has passed the sensor 15. The gating device 18 will only emit a signal at the output 19 when it is in the set condition and receives a signal from the receiver 17, i.e. when it is receiving simultaneous signals from the sensor 15 and receiver 17. Since the gating device has to be reset before it can emit another signal at the output 19, only one output signal can be emitted for each chicken. The gating device is only reset when it receives a new signal from the sensor 15, initiated by the passage of the next trolley. If for some reason an operator has failed to attach a chicken to every shackle, or if a chicken has dropped off, then although each such trolley will cause the sensor 15 to emit a signal and set the gating device, no simultaneous signal will be emitted by the ultrasonic receiver 17 and there will therefore be no signal at the output of the gating device 18. If a chicken has a wing or leg hanging off in such a position that the chicken causes the receiver 17 to emit more than one signal, only the first of these signals will cause an output signal to appear at the output at the output of the gating device 18.

Even if the ultrasonic transmitter and receiver become covered with feathers, dirt, and water, we have found that they still operate satisfactorily.

If it is desired to use the sensing device to count chickens passing a particular point, then the output 19 can be connected to an electrical counting device and the counting device will receive one counting pulse from the gating device 18 for each chicken which passes the sensing device.

The invention is not restricted to the details of the foregoing example. For instance, with reference to FIG. 3, to further increase the reliability of the sensing device, a further ultrasonic transmitter 20 and receiver 21 may be provided, positioned at a different level to the transmitter 16 and receiver 17, the second ultrasonic receiver 21 also being connected to the gating device 18 so that the gating device 18 must receive three simultaneous signals before it will provide a signal at the output 19.

I claim:

1. A sensing device for use in poultry processing to detect the passage of a bird carried by a carrier device, the sensing device comprising:
    (a) a first sensing means which is actuated by the passage of the carrier device;
    (b) a second sensing means which is actuated by the passage of the bird;
    (c) indicating means connected to the first sensing means and to the second sensing means and arranged to emit a signal only when both sensing means are actuated.

2. A sensing device as claimed in claim 1, in which the said second sensing means comprises an untrasonic sensing means.

3. A sensing device as claimed in claim 2, in which the first sensing means and the second sensing means are each arranged to emit an electrical signal when actuated, said indicating means comprising a gate device so that a signal is only emitted by the gate device when the gate device receives two signals simultaneously, one from the first sensing means and one from the second sensing means.

4. A sensing device as claimed in claim 1, in which a third sensing means is provided, for actuation by the passage of a bird, the third sensing means also being connected to the indicating means and the indicating means only being arranged to emit a signal when all three sensing means are actuated.

5. A method of detecting the passage of a bird carried by a carrier device along a path during poultry processing, comprising the steps of:
    (a) positioning a first sensing means in the path of the carrier device for actuation by the carrier device;
    (b) positioning a second sensing means in the path of the bird for actuation by the bird; and
    (c) connecting an indicating device to both sensing means and arranging the indicating device so that it only emits a signal when both sensing means are actuated.

* * * * *